United States Patent [19]

Isobe

[11] Patent Number: 5,291,248

[45] Date of Patent: Mar. 1, 1994

[54] LED CARRIAGE SELECTIVELY MOVABLE IN TWO DIRECTIONS

[75] Inventor: Minoru Isobe, Tokyo, Japan

[73] Assignee: Oki Electric Industry Co., Ltd., Tokyo, Japan

[21] Appl. No.: 836,826

[22] Filed: Feb. 19, 1992

[30] Foreign Application Priority Data

Feb. 28, 1991 [JP] Japan ................................. 3-034814
Mar. 13, 1991 [JP] Japan ................................. 3-048168

[51] Int. Cl.$^5$ ............................................. G03G 15/04
[52] U.S. Cl. ...................................... 355/228; 346/155
[58] Field of Search .............................. 355/228, 229; 346/107 R, 154, 155

[56] References Cited

U.S. PATENT DOCUMENTS

| 4,325,070 | 4/1982 | Akasaki et al. | 346/108 |
| 4,435,064 | 3/1984 | Tsukada et al. | 346/107 R |
| 4,566,015 | 1/1986 | MacKenzie | 346/107 R |
| 4,743,927 | 5/1988 | Sasaki | 346/160 |

FOREIGN PATENT DOCUMENTS

| 2631850 | 1/1978 | Fed. Rep. of Germany . |
| 58-58553 | 4/1983 | Japan . |
| 61-185759 | 8/1986 | Japan . |
| 62-50727 | 3/1987 | Japan . |
| 62-140859 | 6/1987 | Japan . |
| 62-222861 | 9/1987 | Japan . |

OTHER PUBLICATIONS

Patent Abstracts of Japan, vol. 6, No. 254 (E-148) (1132); 14 Dec. 1982 & JP-a-57 152 273 (Ricoh); 20 Sep. 1982; "Abstract".
Patent Abstracts of Japan, vol. 13, No. 426 (P-935) (3774); 22 Sep. 1989 & JP-A-1 159 674 (Canon); 22 Jun. 1989; "Abstract".

*Primary Examiner*—A. T. Grimley
*Assistant Examiner*—Nestor R. Ramirez
*Attorney, Agent, or Firm*—Spencer, Frank & Schneider

[57] ABSTRACT

An electrophotographic recording apparatus includes a plurality of light emitting elements each for irradiating a photoconductive surface of a photoconductor and each having one-luminescent portion per chip; and a driver for reciprocating a carriage in rightward and leftward directions along an arrangement direction of the light emitting elements and in forward and backward directions along a moving direction of the photoconductive surface of the photoconductor. In the apparatus, there is provided such a control that the carriage is moved forward at a speed synchronized with a movement of the photoconductive surface of the photoconductor, while moved rightward or leftward, in succession, the carriage is moved backward in a state that the carriage is not moved at all or hardly moved in the rightward and leftward directions, in succession, the carriage is moved forward at the a speed synchronized with the movement of the photoconductive surface of the photoconductor, while moved leftward or rightward, and in succession, the carriage is moved backward in a state that the carriage is not moved at all or hardly moved in the rightward and leftward directions.

30 Claims, 8 Drawing Sheets

LED CARRIAGE SELECTIVELY MOVABLE IN TWO DIRECTIONS

BACKGROUND OF THE INVENTION

1. Field of the Invention

The present invention relates to an electrophotographic recording apparatus, and more particularly to such a scheme of apparatus that light emitting elements such as light emitting diodes (hereinafter referred to as LED) are arranged at intervals of plural dots, and are reciprocatively moved along the arrangement direction.

2. Description of the Prior Art

Such type of electrophotographic recording apparatus is disclosed, for example, in the Japanese Utility Model Application Laid Open No. 58-58553. According to the conventional such apparatuses, it is possible to reduce the number of light emitting elements and the associated driver circuits by reciprocatively moving an array in which LED's are integrated every other dot. On the other hand, according to most prior arts, a photoconductor is driven on a step basis, and the light emitting elements radiate while vibrating in a state that the photoconductor is stopped. However, it is difficult to rotate stepwise the photoconductor, since the photoconductor is usually extremely large in mass, and thus the photoconductor hinders in higher speed. Further, there is such a problem that rotation and stopping operations of the photoconductor invite non-uniform thickness of a toner layer and thus produce uneven printing density.

On the other hand, according to the Japanese Utility Model Application Laid Open No. 58-58553, the photoconductor is rotated at a constant speed. However, this prior art has such a drawback that a right-hand lowered (or left-hand lowered) line is formed, since a latent image point lowers as the photoconductor moves. This drawback is not a problem in a case where the LED's are arranged every other dot. However, when intervals of the light emitting elements are expanded, or when a rotation velocity of the photoconductor is increased, the latent image points, which are essentially to be formed with a straight line, become an oblique line. Thus, this drawback is a problem in a case where fonts or figures are formed.

As one solution for solving the foregoing problem, there is known the Japanese Patent Application Laid Open No. 62-140859. In this prior art, it is stated that in case of a constant rotation of a photoconductor drum, a LED array module is vibrated with a slight slant in an axis direction so as to obtain a coincidence between a rotation velocity of the photoconductor drum and a photoconductor drum rotational direction component of a transfer velocity of the LED array module. This scheme makes it possible to accurately write a row of dots into the photoconductor drum rotating at a constant speed, when the light emitting elements emit light while vibrating once.

However, according to the scheme in which the LED array module is vibrated with a slant in its entirety, as disclosed in the Japanese Patent Application Laid Open No. 62-140859, the ratio of a velocity of the photoconductor in a moving direction to a velocity of the photoconductor in a direction perpendicular to the moving direction is determined on a univocal basis by an angle of inclination of a guide. Thus, for instance, when the light emitting elements are moved in one direction, it is possible to form a line in a cross direction. However, when the light emitting elements are moved in the opposite direction, the line is formed with a skew. Consequently, the conventional scheme simply permits a printing in a single direction.

Moreover, according to the conventional apparatus as disclosed in the Japanese Utility Model Application Laid Open No. 58-58553, it is difficult to reduce a chip area, since such an apparatus is so arranged that a number of LED's are accommodated into a single chip to form an array. As well known by ones skilled in the art, in order to lower a manufacturing cost of a semiconductor, it is important to reduce the chip area. However, such a prior art fails to consider this point, and thus makes impossible the extreme lowering of the manufacturing cost. Further, in the conventional apparatus, there is such a drawback that it is obliged to replace the chip in its entirety even if only a piece of light emitting element in the chip is damaged. Moreover, a large number of chips are needed for a line of printing. Usually, an irregularity in emission intensity is rare within a chip, but it is large in comparison between the chips. This is a problem. In order to solve this problem, there are needs to add a correction circuit on each chip or to selectively use chips which are almost the same in emission intensity. These needs would increase the manufacturing cost. Furthermore, in a case where the chips are disposed on an alignment basis, there will be formed gaps between the adjacent chips, and thus there is a need to provide the chips with a staggered arrangement. This need brings not only an enlargement of a carriage which is loaded with the light emitting elements, but also an increment in weight of the carriage. Thus, it is necessary to use an expensive driving motor of high potential capacity.

SUMMARY OF THE INVENTION

It is therefore an object of the present invention to provide an improved electrophotographic recording apparatus in accordance with which the foregoing problems are solved.

It is another object of the present invention to provide an electrophotographic recording apparatus capable of performing a bi-directional printing.

It is still another object of the present invention to provide an electrophotographic recording apparatus capable of reducing a chip area for accommodating light emitting elements.

In accordance with a preferred embodiment of the present invention, there is disclosed an electrophotographic recording apparatus comprising: a photoconductor of which photoconductive surface continuously moves forward; a plurality of light emitting elements each for irradiating the photoconductive surface of the photoconductor; a carriage disposed over and against the photoconductor and provided with a plurality of light emitting elements in such a manner that the plurality of light emitting elements are arranged at equal space intervals in a direction perpendicular to a moving direction of the photoconductive surface of the photoconductor; and driving means for reciprocatively moving the carriage rightward and leftward along the arrangement direction of the light emitting elements, and forward and backward along the moving direction of the photoconductive surface of the photoconductor, wherein the driving means includes a first driving means for driving the carriage forward and backward, and a second driving means for driving the carriage rightward and leftward, the second driving means being substantially independent of the first driving means in operation, and wherein said recording apparatus further comprises driving control means for causing the driving means to provide such a control that the carriage is moved forward at a speed synchronized with a movement of the photoconductive surface of the photoconductor, while moved rightward or leftward, in succession, said carriage is moved backward in a state that the carriage is not moved at all or hardly moved rightward and leftward, in succession, the carriage is moved forward at a speed synchronized with the movement of the photoconductive surface of the photoconductor, while moved leftward or rightward, and in succession, the carriage is moved backward in a state that the carriage is not moved at all or hardly moved rightward and leftward. According to the present invention as stated above, it is possible to perform a bi-directional printing with a high printing density, with the reduced number of light emitting elements.

In accordance with another embodiment of the present invention, there is disclosed an electrophotographic recording apparatus comprising: a photoconductor of which photoconductive surface is continuously moved; a plurality of light emitting elements arranged at equal space intervals in a direction perpendicular to a moving direction of the photoconductor, and disposed in such a manner that luminescent portions of the light emitting elements face the photoconductive surface of the photoconductor; and driving means for reciprocatively moving the light emitting elements along the arrangement direction of the light emitting elements, wherein light emitting elements each having one-luminescent portion per chip are arranged at equal space intervals. According to the present invention as stated above, it is possible to employ light emitting elements each having a smaller chip area. Further, even if there occurs a breakage of the light emitting elements or an irregularity in emission intensity, it is sufficient to individually replace the light emitting elements in units of chip. Moreover, it is possible to put the light emitting elements in a row, providing sufficient intervals between the light emitting elements.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
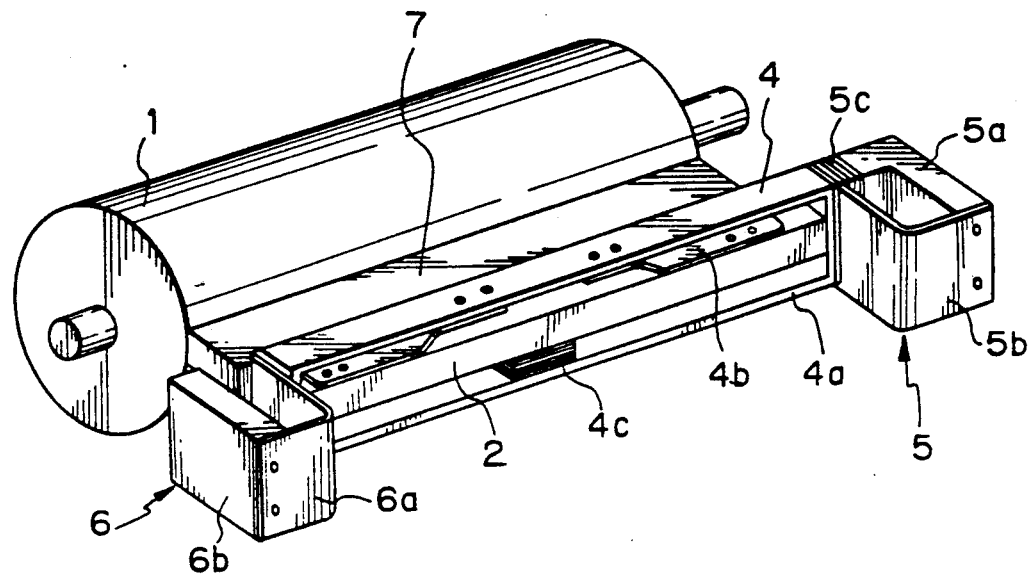
FIG. 1 is a perspective view of an electrophotographic recording apparatus according to a first illustrative embodiment of the present invention.
Figure 2:
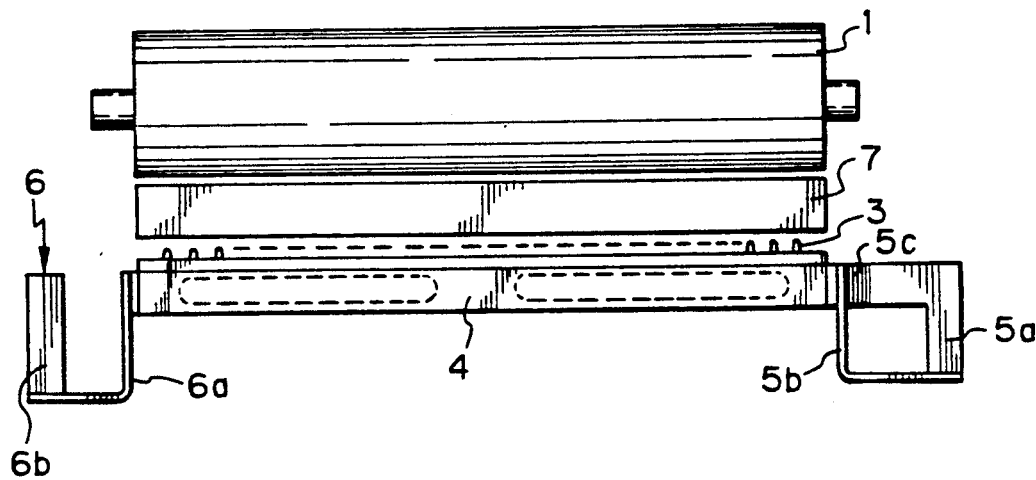
FIG. 2 is a top plan view of the electrophotographic recording apparatus according to the first illustrative embodiment.

FIG. 1 is a perspective view of an electrophotographic recording apparatus according to a first illustrative embodiment of the present invention, and FIG. 2 is a top plan view of the electrophotographic recording apparatus according to the first illustrative embodiment. In these figures, reference numeral 1 denotes a cylindrical configuration of photoconductor which is driven by a motor (not illustrated) for rotation at constant speed; numeral 2 denotes a carriage disposed over and against the photoconductor 1; numeral 3 denotes light emitting diodes (LED's) mounted on the carriage 2 in such a manner that they are disposed at every 64 dots intervals in a longitudinal direction such that a luminescence plane of the LED faces the photoconductor 1; numeral 4 denotes a vertical shift driver means comprising a frame 4a surrounding the carriage 2, two first leaf springs 4b placed between the frame 4a and the carriage 2 for depressing downward the carriage 2, and a first piezoelectric element 4c for driving the carriage upward (a forward direction along a moving direction of a surface of the photoconductor 1) against a force of the first leaf springs 4b; numeral 5 denotes a horizontal shift driver means for vibrating the carriage 2 rightward and leftward, comprising an L-shaped first block 5a, an L-shaped second leaf spring 5b having one end fixed to one end of the first block 5a, and the other end fixed to a right end of the frame 4a, a stacked-layer type of second piezoelectric element 5c fixed to another end of the first block 5a so as to deform itself in response to an application of a voltage by a power source (not illustrated) for deforming the second leaf spring 5b, numeral 6 denotes a spring support mechanism comprising an L-shaped third leaf spring 6a having one end fixed to a left end of the frame 4a, and a second block 6b for supporting the third leaf spring 6a, and 7 a photo-guide, such as Selfoc Lens (registered trademark of Nihon Sheet Glass Kabushiki Kaisha), disposed between the carriage 2 and the photoconductor 1 for leading light emitted from LED 3 to a surface of the photoconductor 1, the photo-guide being fixed to a frame (not illustrated).

Figure 3A:
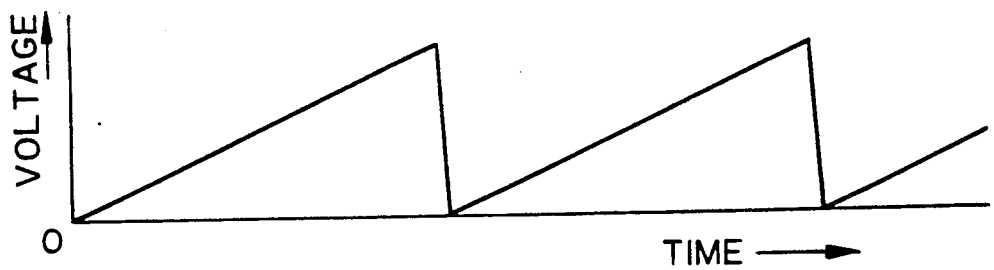
FIGS. 3A and 3B are views showing waveforms of voltage to be applied to first and second piezoelectric elements, respectively.
Figure 3B:
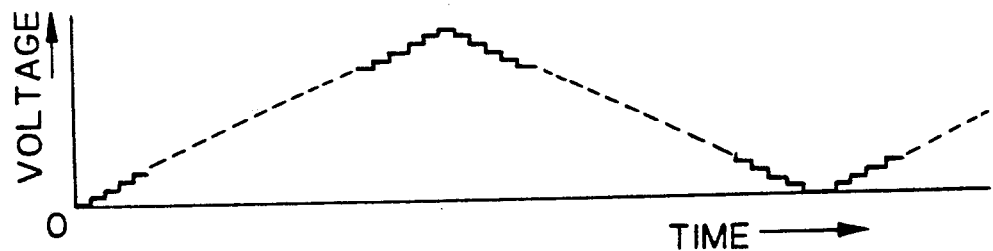

An operation of the electrophotographic recording apparatus having above structure is as follows: first, the photoconductor 1 is driven at a constant speed by a motor (not illustrated). When the photoconductor 1 reaches a constant speed, voltages having waveforms shown in FIGS. 3A and 3B are applied to the first and second piezoelectric elements 4c and 5c, respectively, so that the carriage 2 is moved upward and downward reciprocatively in a tangential direction of the photoconductor 1. More in detail, when there is applied to the first piezoelectric element 4c a voltage which increases on a linear basis, the first piezoelectric element 4c expands in a stacked-layer direction, so that the carriage 2 moves upward continuously while a deformation is provided on the first leaf springs 4b. When there is applied to the second piezoelectric element 5c in synchronism with the above-mentioned operation a voltage which increases stepwise from 1st to 64th step, the second piezoelectric element 5c expands little by little, so that the frame 4a moves to the left while a deformation is provided on the second leaf springs 5b. Thus, LED 3 emits light whenever the carriage 2 is moved by the second piezoelectric element 5c applied one of 64 step voltages, so that the photoconductor 1 is subjected to one-dot exposure through the photo-guide 7. If this is performed on every 64 step voltages, there will be formed 64 dots of line of each LED on the photoconductor 1 and thus formed as a complete straight line extending over an approximately overall width of the photoconductor 1. When the 64-step movement has been completed, if the voltage applied to the first piezoelectric element 4c is decreased at a stretch to zero, the first piezoelectric element 4c rapidly returns to the original configuration, so that the carriage 2 rapidly goes down by corresponding one-dot by the corresponding force of the first leaf springs 4b. Next, when there is again applied to the first piezoelectric element 4c a voltage which increases on a linear basis, the first piezoelectric element 4c again expands in a stacked-layer direction thereof, so that the carriage 2 moves upward continuously while a deformation is provided on the first leaf springs 4b. When there is applied to the second piezoelectric element 5c in synchronism with the abovementioned operation a voltage which decreases stepwise from 64th to 1st step, the second piezoelectric element 5c contracts little by little, so that the frame 4a moves back to the right by the force of the second leaf springs 5b. Thus, LED 3 emits light whenever the carriage 2 moves onto one of the 64 steps, so that the photoconductor 1 is subjected to one-dot exposure through the photo-guide 7. If this is performed on every 64 steps, there will be formed a straight latent image line of 64 dots by each LED on the photoconductor 1 and thus formed a complete straight line extending over an approximately overall width of the photoconductor 1. If the voltage applied to the first piezoelectric element 4c is decreased at a stretch to zero when 64-step movement has been completed, the first piezoelectric element 4c rapidly returns to the original configuration, so that the carriage 2 rapidly goes down by corresponding one-dot by the corresponding force of the first leaf springs 4b. It is possible to form one latent line after another on the photoconductor 1 by repeating such operations. Of course, since luminescence of LED 3 is controlled in accordance with an image data to be printed, there may be formed on the photoconductor 1 a latent image according to the image data.

Thereafter, the latent image is developed by a conventional developer assembly, a toner is transferred to a sheet by a transfer assembly, a fixing disposal is implemented, and then the sheet is discharged.

Figure 4:
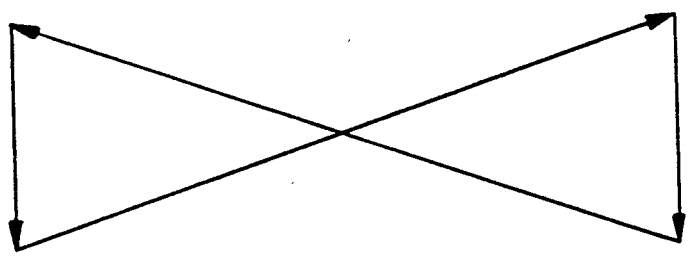
FIG. 4 is a view showing the movement of a carriage 2.

FIG. 4 is a view showing the movement of the carriage 2, that is, representing such a series of movements that the carriage 2 moves right-upward, downward, left-upward, and again downward.

Figure 5:
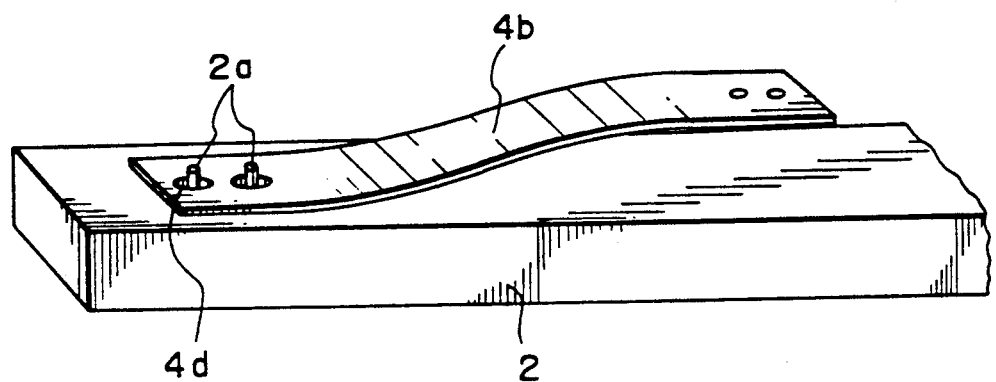
FIG. 5 is a perspective view showing a coupling relation between the carriage 2 and a first leaf spring 4b.

FIG. 5 is a perspective view showing a coupling relation between the carriage 2 and the first leaf spring 4b. While the first leaf spring 4b is fixed to the frame 4a by rivets or welding, there is arranged, to the carriage 2, as shown in the figure, such that pins 2a mounted on the carriage 2 are movable in a longitudinal direction within slots 4d provided on the first leaf spring 4b, respectively.

Figure 6:
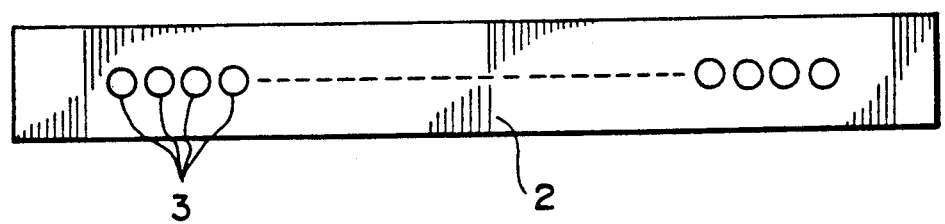
FIG. 6 is a top plan view of the carriage 2.

FIG. 6 is a top plan view of the carriage 2. Assuming a printing density as 300 dpi, and a printing width as 184 mm, when 64-dot printing is performed by each LED there are arranged 34 LED's at intervals of about 5.42 mm.

The LED 3 having 34 LED's is used in these preferred embodiments. However, it should be noticed that the number of LED is varied in accordance with the printing width, the dot density, or the rotational speed of the photoconductor.

Figure 7:
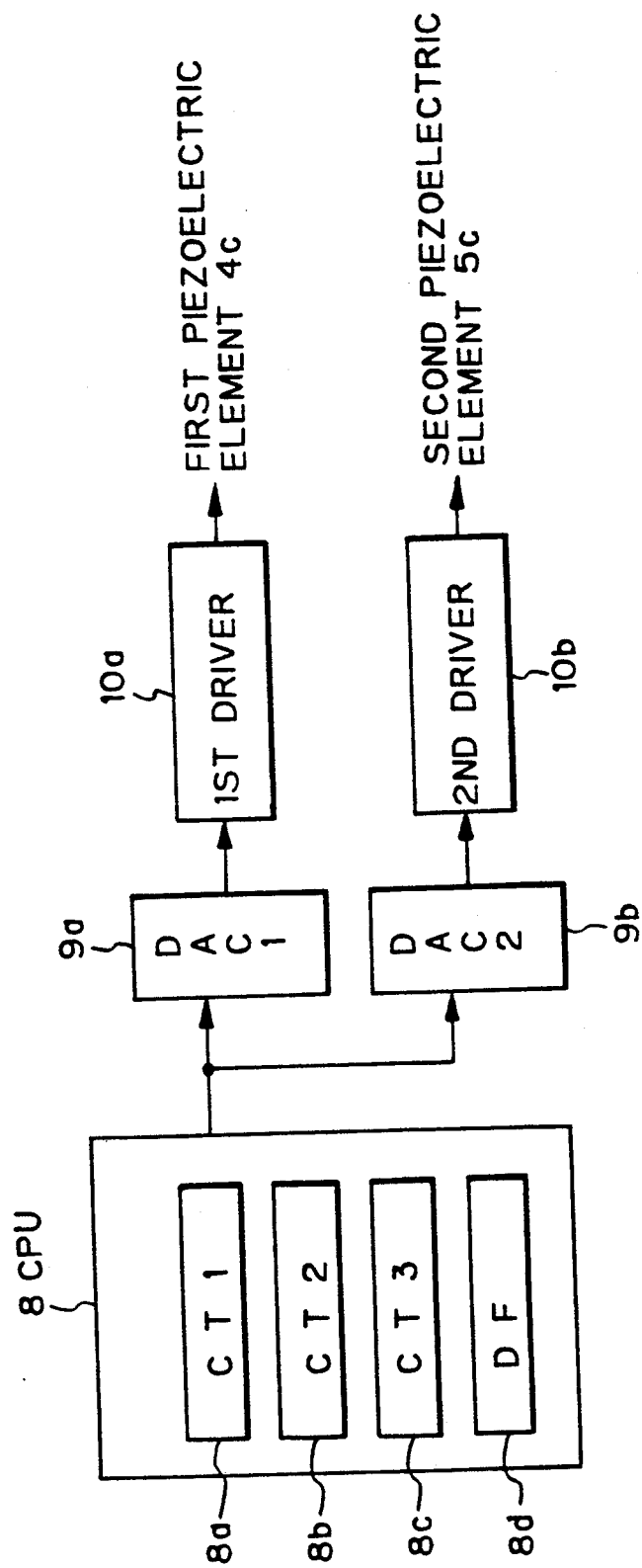
FIG. 7 is a block diagram showing an example of a driving circuit.

FIG. 7 is a block diagram showing an example of a driving circuit suitable for the first embodiment as stated above. In FIG. 7, reference numeral 8 denotes a CPU comprising a microprocessor including a ROM for storing a program and a RAM for temporarily storing data for use in arithmetic operation. In the CPU 8, parts of the RAM are used as a first counter 8a, a second counter 8b, a third counter 8c and a direction flag 8d respectively. Reference numerals 9a and 9b denote first and second digital/analog converters for converting digital data output from the CPU 8 to an analog voltage, respectively. Reference numerals 10a and 10b denote first and second drivers for amplifying in electric power outputs of the first and second digital/analog converters 9a and 9b, respectively. The first and second drivers 10a and 10b are operative to drive the first and second piezoelectric elements 4c and 5c, respectively. Values set to input registers of the first and second digital/analog converters 9a and 9b are designated as DAC 1 and DAC 2, respectively.

Figure 8:
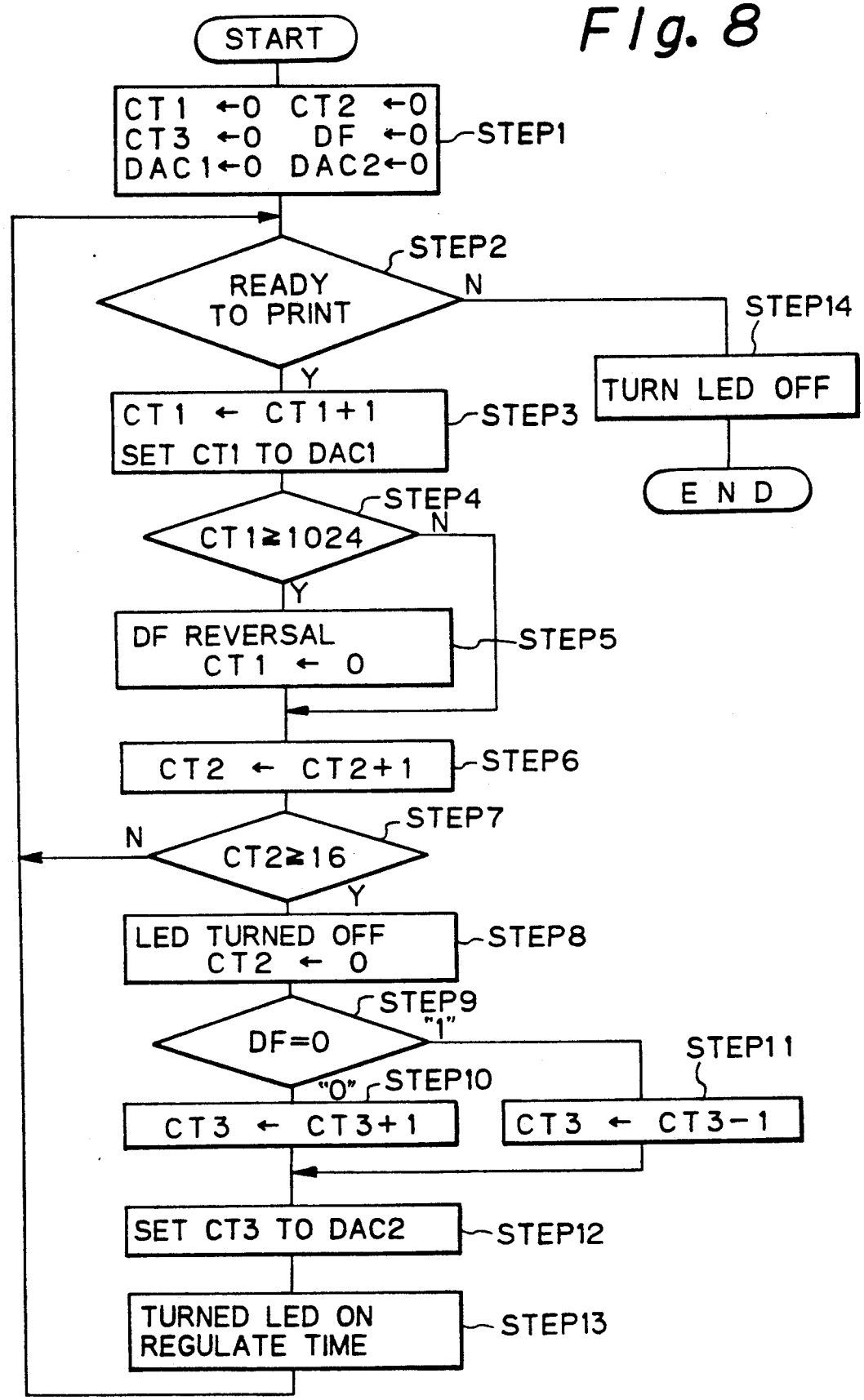
FIG. 8 is a flow chart for explanation of an operation of the driving circuit.

The operation of the driving circuit will be explained referring to the flow chart of FIG. 8. For explanation, the values of the first counter 8a, the second counter 8b, the third counter 8c and the direction flag 8d are designated as CT 1, CT 2, CT 3 and DF, respectively.

Now in step 1, the first counter 8a, the second counter 8b, the third counter 8c and the direction flag 8d are cleared, and with zero the first and second drivers 10a and 10b are set with zero values respectively. In this condition, both the first and second piezoelectric elements 4c and 5c are each in the most contracted state, and thus the carriage 2 is located at the right end and also is at the lowest site.

In step 2, a determination is made on whether the printing is available or not. When it is determined that the printing is not available due to any abnormality in the apparatus, the operation is stopped without printing. On the other hand, when it is determined that the printing is available, then the procedure proceeds to step 3.

In step 3, the value CT 1 of the first counter 8a is increased by 1, then the increment, CT 1+1, is set to the first digital/analog converter 9a. Thus, the first digital/analog converter 9a outputs a voltage corresponding to the value CT 1 of the first counter 8a to the first driver 10a, and the first driver 10a amplifies the voltage and then supplies the amplified voltage to the first piezoelectric element 4c. As a result, the carriage 2 goes up one step.

In step 4, a determination is made on whether the value CT 1 of the first counter 8a is equal to or more than 1024. When it is determined that the value CT 1 is equal to 1024, the procedure proceeds to step 5, in which a value DF of the direction flag 8d is reversed from 0 to 1 (or from 1 to 0) and the value CT 1 of the first counter 8a is reset to 0, and then the procedure proceeds to step 6. On the other hand, when it is determined that the value CT 1 is less than 1024, then the procedure proceeds directly to step 6.

In step 6, the value CT 2 of the second counter 8b is increased by 1.

In step 7, a determination is made on whether the value CT 2 of the second counter 8b is equal to or more than 16. When it is determined that the value CT 2 is equal to 16, the procedure proceeds to step 8, in which the LED's are turned off and the value CT 2 of the second counter 8b is reset to 0, and then the procedure proceeds to step 9. On the other hand, when it is determined that the value CT 2 is less than 16, then the procedure is returned to step 2.

In step 9, a determination is made on whether the value DF of the direction flag 8d is 0 or 1. When it is determined that the value DF is 0, the procedure proceeds to step 10, in which the value CT 3 of the third counter 8c is increased by 1, and then the procedure proceeds to step 12. On the other hand, when it is determined that the value DF is 1, the procedure proceeds to step 11, in which the value CT 3 of the third counter 8c is decreased by 1, and then the procedure proceeds to step 12.

In step 12, the value CT 3 of the third counter 8c is set to the second digital/analog converter 9b. Then, the procedure proceeds to step 13.

In step 13, the LED's are turned on, and further additional processing is performed or an idle period is provided for a time regulation. Then, the procedure is returned to step 2. Thus, the second digital/analog converter 9b outputs a voltage corresponding to the value CT 3 of the third counter 8c to the second driver 10b, and the second driver 10b amplifies the voltage and then an amplified voltage to the second piezoelectric element 5c. As a result, the second piezoelectric element 5c expands, so that the carriage 2 is moved leftward (or rightward).

If the aforementioned operation is repeated, the first counter 8a continues to count until reaching a count value 1024, and upon reaching the count value 1024, the value DF of the direction flag 8d is reversed (now zero is reset). Further, whenever the value CT 2 of the second counter 8b becomes 16, the value CT 3 of the third counter 8c is increased or decreased by 1 in accordance with the value DF of the direction flag 8d. Since the value DF of the direction flag 8d is not changed until the value CT 1 of the first counter 8a reaches 1024, the value CT 3 of the third counter 8c is increased from 0 to 63 and thereafter decreased from 63 to 0. Thus, since the values of the first counter 8a and the third counter 8c are varied, the first piezoelectric element 4c expands on a substantially linear basis on the step of 1024 counting, so that the carriage 2 continuously is moved up by the corresponding one dot. On the other hand, the second piezoelectric element 5c expands on only 64 steps within the same period of time, so that the carriage 2 is moved stepwise rightward or leftward by one dot 64 times.

The LED's are turned off while the carriage 2 is moved rightward or leftward, and are turned on in accordance with the printing data during a stationary period of time before the subsequent movement of the carriage 2.

The processing time from step 2 to step 13 may be adjusted in step 13. Thus, it is possible to equalize a distance by which the carriage 2 rises while the first counter 8a counts 1024 to a distance by which a surface of the photoconductor 1 moves during the same period of time, thereby providing a relatively stationary state therebetween. Therefore, according to the present embodiment, it is preferable to use such a type of LED that a composition plane is luminous in its entirety, and also to form an emission plane completely round or square.

When all the printing data are printed, the printing becomes unavailable in step 2. Then the procedure proceeds to step 14 in which the LED's are turned off, and then the printing operation is terminated.

As the light emitting element, such as LED, there may be employed a light emitting element having a luminescent portion per chip.

Regarding a synchronization between the photoconductor 1 and the carriage 2, it is possible to perform the driving control for the photoconductor 1 and the carriage 2 with either the same CPU or the mutually different CPU's.

Further, in order to synchronize the light emitting operation of the LED's in the arrangement direction with the movements of first and second driving means in the moving direction of the photoconductor 1, there may be provided sensors at the respective moving home positions so that they are given as synchronous home positions.

Furthermore, while the present embodiment has been explained in the aforementioned flow chart as an open loop control, it may be so arranged that a rotational quantum of the photoconductor 1 is detected by a sensor, and a detection signal of the sensor is fed back to control a movement of the carriage 2.

In the aforementioned driving circuit, for instance, if a rotating speed of the photoconductor 1 is increased twice, and each of the counters is loaded with an increment 2 instead of the increment 1, it is possible to expect a printing speed twice as rapid at a half printing density and thus to reduce the toner consumption to the half.

Further, if a rotating speed of the photoconductor 1 is not changed, and each of the counters is loaded with the increment 2/decrement 2 instead of the increment 1/decrement 1, it is possible to maintain the same printing speed at a half printing density. Also, in this case, the toner consumption is reduced to the half.

Likewise, the change of a counting rate of the counter on the rotational speed of the photoconductor 1 makes it possible to perform the printing at various printing densities, such as 100 DPI, 200 DPI, 300 DPI, 400 DPI, 600 DPI, and 1200 DPI. Further, while the present embodiment has been explained on the step of 1024 count for printing of one-line, for the purpose of simplifying the explanation, the usual control is more fine, and the present invention is not restricted to the 1024-step control. Moreover, the increment/decrement of each of the counters is also not restricted to a one by one basis.

Figure 9A:
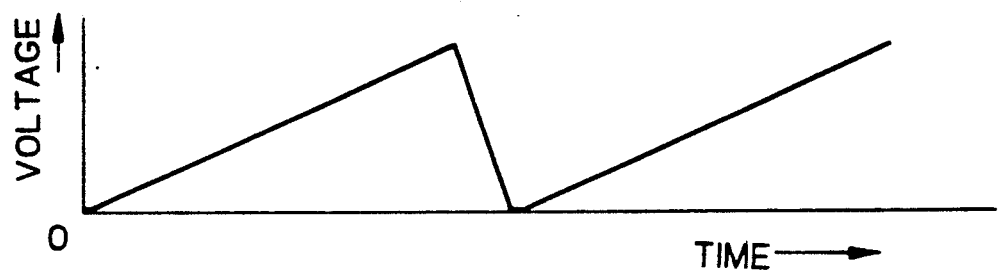
FIGS. 9A and 9B are views showing waveforms of voltage to be applied to first and second piezoelectric elements in unidirectional printing, respectively.
Figure 9B:
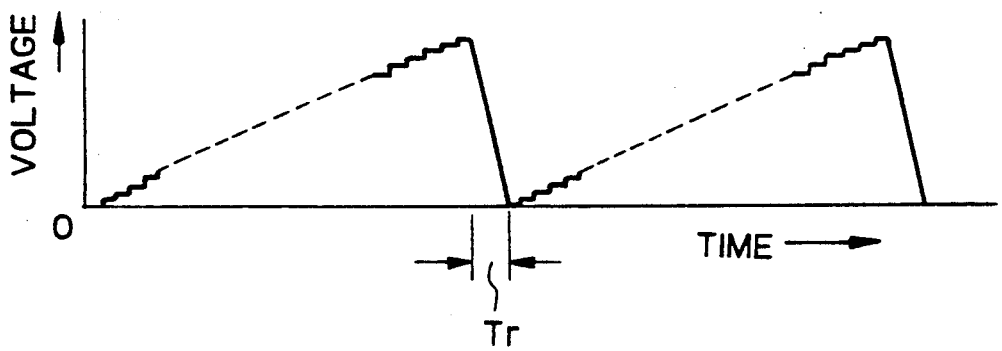

According to the present embodiment as mentioned above, the bi-directional printing is implemented. It should be noticed, however, that a one way printing is also possible, if there is provided such a control that a voltage having the waveform as shown in FIG. 9A is applied to the first piezoelectric element 4c, and a voltage having the waveform as shown in FIG. 9B is applied to the second piezoelectric element 5c. In one way printing, it is possible to implement a fine printing for a vertical line since there occurs no displacement or slippage in the printing of a vertical line, even if the LED's are mounted with less accuracy. Therefore, it is preferable that there is provided a switch for alternatively selecting a normal mode or a high speed printing mode, and in addition there is arranged such a manner that this switch may be manually operated or electrically switched through a host computer system such as a personal computer. When a better quality in printing is needed, the one way printing may be selected and when a high speed printing is needed, then the bi-directional printing may be selected. Further, according to the one way printing, while it is necessary to return the carriage 2 to the right end or to the left end, it is difficult to return the carriage 2 at a high speed because of a large stroke. Thus, this makes impossible the printing during the returning period Tr. Then dot pitches in a row direction become rough. Therefore, it is preferable in the one way printing to select a lower rotational speed of the photoconductor 1.

Figure 13:
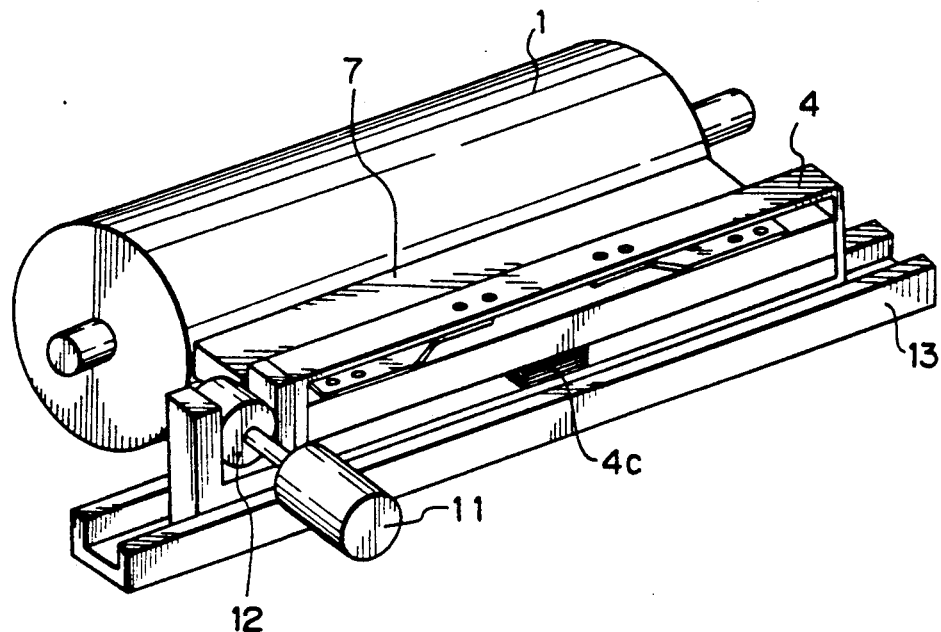
FIG. 13 is a perspective view of an electrophotographic recording apparatus according to a third illustrative embodiment of the present invention.
Figure 14:
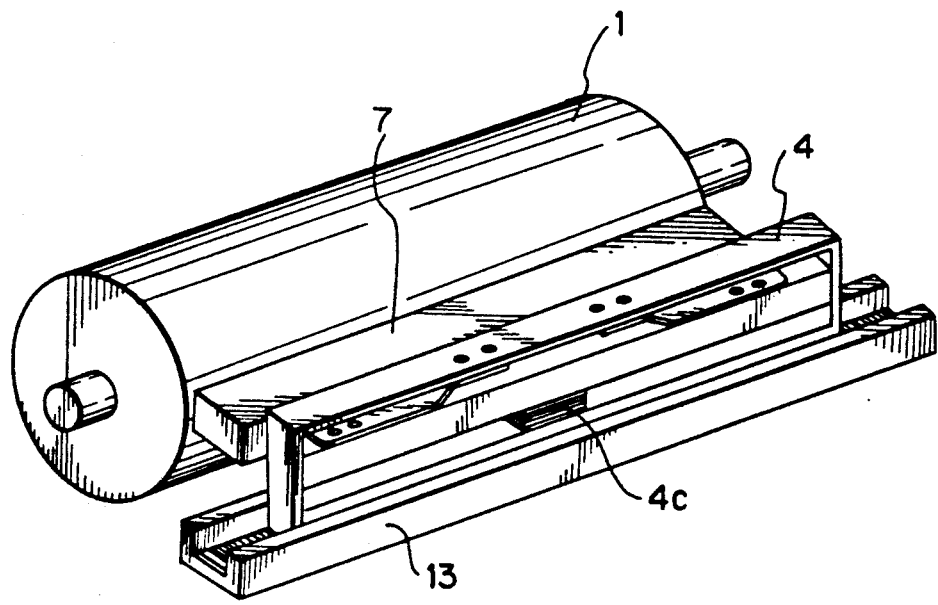
FIG. 14 is a perspective view of an electrophotographic recording apparatus according to a fourth illustrative embodiment of the present invention.

Further, according to the present embodiment as mentioned above, the piezoelectric element is used as the driving means for moving the shift block 4 rightward and leftward. It may be so arranged, however, when a sufficient stroke can not be obtained by the piezoelectric element, either that, for instance, as shown in FIG. 13, a rotational movement of a motor 11 (e.g. a stepping motor) is transformed into a reciprocative movement of an eccentric cam 12 to move the shift block 4 rightward and leftward, or that, as shown in FIG. 14, a linear motor 13 is used to move the shift block 4 rightward and leftward. As the driving means for shifting the shift block 4 upward and downward, the piezoelectric element is excellent in the point that it is possible to perform a digital control for a micro-distance on a multi-step basis. It is noted, however, that the various types of motor, such as a stepping motor and a DC motor, may also be used as such a driving means.

Moreover, according to the present embodiment as mentioned above, while there are used two driving means, the first piezoelectric element 4c and the second piezoelectric element 5c, it is sufficient that they are substantially independent of each other, and it may be so arranged, for instance, that the rotational movement or force of a single motor is transformed into a reciprocative movement or force of the eccentric cam so that the carriage vibrates rightward and leftward, and in addition an electromagnetic clutch and a gear are coupled with this motor to intermittently take out powers and further to reverse the vibrating direction, so that the vibrating direction of the carriage is shifted to upward and downward direction.

Figure 10:
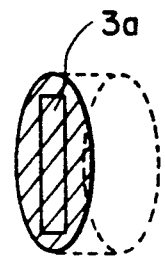
FIG. 10 is a view showing a luminescence intensity distribution of an LED.
Figure 11:
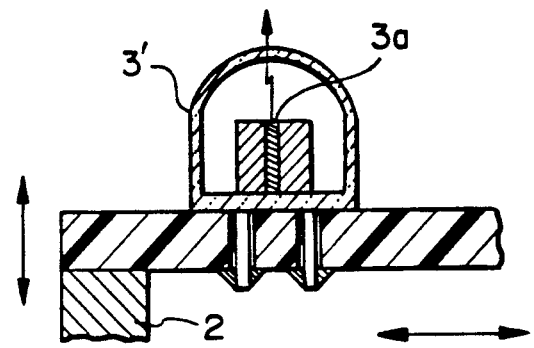
FIG. 11 is a sectional view showing a mounting direction of an LED.

It is still noted that the carriage may be continuously moved instead of being moved stepwise from 1st to 64th step. In this case, the formed dots are expanded like a flow, and it will be a cause of a so-called trailing. Consequently, in this case, it is preferable to use such a type of LED that an edge plane of a composition section is luminous, and in addition to mount a composition plane in such a manner that it is aligned in a direction along the rotational direction of the photoconductor. That is, this type of LED is luminous with an intensity distribution as shown in FIG. 10, in which the luminosity expands in a direction along the composition plane 3a, and thus provides a light emission in form of an ellipse as indicated with hatching. However, if the LED's is mounted as illustrated in FIG. 11, there is exposed an area including a portion shown with broken lines due to the tailing, and thus the dot becomes nearly a complete round, thereby improving a quality in printing.

It is still noted that if LED's each with a condenser lens are used, there will be no need to provide the photo-guide, such as Selfoc Lens (registered trademark of Nihon Sheet Glass Kabushiki Kaisha).

Figure 12:
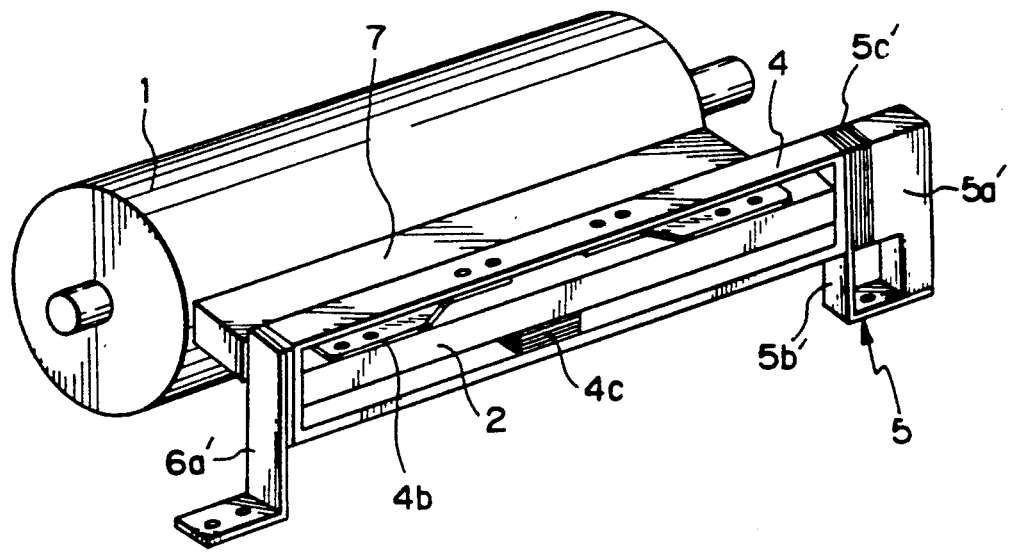
FIG. 12 is a perspective view of an electrophotographic recording apparatus according to a second illustrative embodiment of the present invention.

Still moreover, according to the present embodiment as mentioned above, the shift block 4 is vibrated along the tangential plane of the photoconductor 1, about the bent portions of the second leaf spring 5b and the third leaf spring 6a. Thus, microscopically, the distance between the shift block 4 and the photoconductor 1 will be changed as the shift block vibrates, and it is feared that there occurs blooming. In this case, it may be so arranged that as shown in FIG. 12, the shift block 4 is supported in such a manner that the shift block 4 is moved reciprocatively by a second leaf spring 5b' and a third leaf spring 6a' of which mounting directions differ 90°.

Still moreover, according to the present embodiment as mentioned above, there has been explained that the carriage 2 is moved upward and downward, and rightward and leftward by unitary one-dot. It may be modified such that the carriage 2 is moved by unitary one-half dot or unitary one-third dot so as to overlap the dots. That is, it may be so modified that one or plural intermediate dots may be formed between basic dots.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An electrophotographic recording apparatus comprising:
    a photoconductor having a photoconductive surface which is continuously moved forward;
    a plurality of light emitting elements each for irradiating the photoconductive surface of said photoconductor;
    a carriage disposed over and against said photoconductor, said plurality of light emitting elements being mounted on said carriage in such a manner that they are arranged at equal space intervals in a direction perpendicular to a moving direction of the photoconductive surface of said photoconductor; and
    driving means for reciprocating said carriage in right and left directions along the arrangement direction of the light emitting elements and in forward and backward directions along the moving direction of the photoconductive surface of said photoconductor,
    wherein said driving means includes a first driving means for driving said carriage in the forward and backward directions, and a second driving means for driving said carriage in the right and left directions, said second driving means being substantially independent of said first driving means in operation, and
    wherein said recording apparatus further comprises driving control means for causing said driving means to provide such a control that said carriage is moved forward at a speed synchronized with a movement of the photoconductive surface of said photoconductor, while moved rightward or leftward, in succession, said carriage is moved backward in a state that said carriage is not moved at all or hardly moved in the right and left directions, in succession, said carriage is moved forward at a speed synchronized with the movement of the photoconductive surface of said photoconductor, while moved leftward or rightward, and in succession, said carriage is moved backward in a state that said carriage is not moved at all or hardly moved in the right and left directions.

2. An apparatus according to claim 1, wherein said first driving means comprises a frame surrounding the carriage, two first leaf springs being placed between the frame and the carriage for depressing downward the carriage, and a first piezoelectric element for driving the carriage upward against a force of the first leaf springs.

3. An apparatus according to claim 2, wherein said second driving means comprises an L-shaped first block, an L-shaped second leaf spring having one end fixed to one end of the first block, and the other end fixed to a right end of the frame, a stacked-layer type of second piezoelectric element adapted to deform itself in response to an application of a voltage by a power source for deforming the second leaf spring, the second piezoelectric element being fixed to the other end of the first block.

4. An apparatus according to claim 3, further comprising a spring support mechanism comprising an L-shaped third leaf spring having one end fixed to a left end of the frame, and a second block for supporting the third leaf spring, and a photo-guide disposed between the carriage and the photoconductor for leading light emitted from the light emitting elements to a surface of the photoconductor.

5. An apparatus according to claim 1, wherein said second driving means comprises an L-shaped first block, an L-shaped leaf spring having one end fixed to one end of the first block, and the other end fixed to one end of a frame, a stacked-layer type of second piezoelectric element adapted to deform itself in response to an application of a voltage by a power source for deforming the leaf spring, the second piezoelectric element being fixed to the other end of the first block.

6. An apparatus according to claim 1, wherein said first driving means comprises a motor.

7. An apparatus according to claim 6, wherein said motor is a stepping motor.

8. An apparatus according to claim 6, wherein said motor is a DC motor.

9. An apparatus according to claim 1, wherein said second driving means comprises a linear motor.

10. An apparatus according to claim 1, wherein said second driving means comprises a motor and an eccentric cam, and a rotational force of the motor is transformed into a reciprocative force by the eccentric cam.

11. An apparatus according to claim 10, wherein said motor is a stepping motor.

12. An apparatus according to claim 1, wherein said driving means is arranged in such a manner that a rotational force of a single motor is transformed into a reciprocative force by an eccentric cam so that the carriage vibrates rightward and leftward, and in addition an electromagnetic clutch and a gear are coupled with said motor to intermittently take out power and further to reverse the vibrating direction so that the carriage shifts upward and downward.

13. An apparatus according to claim 1, wherein each of said light emitting elements is provided with a condenser lens.

14. An apparatus according to claim 3, wherein a shift block including said frame surrounding the carriage is vibrated along the tangential plane of said photoconductor, with the bent portions of the second leaf spring and the third leaf spring.

15. An apparatus according to claim 14, wherein said shift block is supported in such a manner that the shift block is moved reciprocatively by a second leaf spring and a third leaf spring of which the mounting directions differ by 90°.

16. An electrophotographic recording apparatus comprising:
 a photoconductor having a photoconductive surface which is continuously moved forwards;
 a plurality of light emitting elements each for irradiating the photoconductive surface of said photoconductor, and each having one-luminescent portion per chip;
 a carriage disposed over and against said photoconductor, said plurality of light emitting elements being mounted on said carriage in such a manner that they are arranged at equal space intervals in a direction perpendicular to a moving direction of the photoconductive surface of said photoconductor; and
 driving means for reciprocatively moving said carriage in rightward and leftward directions along the arrangement direction of the light emitting elements and in forward and backward directions along the moving direction of the photoconductive surface of said photoconductor,
 wherein said driving means includes a first driving means for driving said carriage in the rightward and leftward directions, and a second driving means for driving said carriage in the forward and backward directions, said second driving means being substantially independent of said first driving means in operation, and
 wherein said recording apparatus further comprises driving control means for causing said driving means to provide such a control that said carriage is moved forward at a speed synchronized with a movement of the photoconductive surface of said photoconductor, while moved rightward or leftward, in succession, said carriage is moved backward in a state that said carriage is not moved at all or hardly moved in the rightward and leftward directions, in succession, said carriage is moved forward at a speed synchronized with the movement of the photoconductive surface of said photoconductor, while moved leftward or rightward, and in succession, said carriage is moved backward in a state that said carriage is not moved at all or hardly moved in the rightward and leftward directions.

17. An apparatus according to claim 16, wherein said first driving means comprises a frame surrounding the carriage, two first leaf springs being placed between the frame and the carriage for depressing the carriage downward, and a first piezoelectric element for driving the carriage upward against a force of the first leaf springs.

18. An apparatus according to claim 17, wherein said second driving means comprises an L-shaped first block, an L-shaped second leaf spring having one end fixed to one end of the first block, and the other end fixed to a right end of the frame, a stacked-layer type of second piezoelectric element adapted to deform itself in response to an application of a voltage by a power source for deforming the second leaf spring, the second piezoelectric element being fixed to the other end of the first block.

19. An apparatus according to claim 18, further comprising a spring support mechanism comprising an L-shaped third leaf spring having one end fixed to a left end of the frame, and a second block for supporting the third leaf spring; and a photo-guide disposed between the carriage and the photoconductor for leading light emitted from the light emitting elements to a surface of the photoconductor.

20. An apparatus according to claim 16, wherein said second driving means comprises an L-shaped first block, an L-shaped leaf spring having one end fixed to one end of the first block, and the other end fixed to one end of a frame, a stacked-layer type of second piezoelectric element adapted to deform itself in response to an application of a voltage by a power source for deforming the leaf spring, the second piezoelectric element being fixed to the other end of the first block.

21. An apparatus according to claim 16, wherein said first driving means comprises a motor.

22. An apparatus according to claim 21, wherein said motor is a stepping motor.

23. An apparatus according to claim 21, wherein said motor is a DC motor.

24. An apparatus according to claim 16, wherein said second driving means comprises a linear motor.

25. An apparatus according to claim 16, wherein said second driving means comprises a motor and an eccentric cam, and a rotational force of the motor is transformed into a reciprocative force by the eccentric cam.

26. An apparatus according to claim 25, wherein said motor is a stepping motor.

27. An apparatus according to claim 16, wherein said driving means is arranged in such a manner that a rotational force of a single motor is transformed into a reciprocative force by an eccentric cam so that the carriage vibrates rightward and leftward, and in addition an electromagnetic clutch and a gear are coupled with said motor to intermittently take out powers and further to reverse the vibrating direction so that the carriage shifts upward and downward.

28. An apparatus according to claim 16, wherein each of said light emitting elements is provided with a condenser lens.

29. An apparatus according to claim 18, wherein a shift block including said frame surrounding the carriage is vibrated along the tangential plane of said photoconductor, by the bent portions of the second leaf spring and the third leaf spring.

30. An apparatus according to claim 29, wherein said shift block is supported in such a manner that the shift block reciprocatively is moved by a second leaf spring and a third leaf spring of which the mounting directions differ by 90°.

* * * * *